United States Patent [19]
Foo

[11] Patent Number: 5,844,724
[45] Date of Patent: Dec. 1, 1998

[54] WIDE ANGLE ZOOM LENS

[75] Inventor: Leslie D. Foo, San Jose, Calif.

[73] Assignee: Nikon Corporation, Japan

[21] Appl. No.: 933,796

[22] Filed: Sep. 19, 1997

Related U.S. Application Data

[63] Continuation of Ser. No. 773,504, Dec. 23, 1996, abandoned.

[51] Int. Cl.$^6$ ............ G02B 15/14; G02B 13/18
[52] U.S. Cl. ............................ 359/691; 359/708
[58] Field of Search .................. 359/691, 708, 359/689, 686

[56] References Cited

U.S. PATENT DOCUMENTS

| | | | |
|---|---|---|---|
| 4,155,629 | 5/1979 | Nakamura | 350/184 |
| 4,477,153 | 10/1984 | Suda et al. | 350/426 |
| 4,607,918 | 8/1986 | Ogata | 350/426 |
| 4,838,668 | 6/1989 | Betensky et al. | 350/427 |
| 4,889,416 | 12/1989 | Yamada | 350/426 |
| 4,963,005 | 10/1990 | Tsuji | 350/426 |
| 5,000,550 | 3/1991 | Takahashi et al. | 350/426 |
| 5,164,859 | 11/1992 | Ito | 359/692 |
| 5,179,473 | 1/1993 | Yano et al. | 359/691 |
| 5,182,673 | 1/1993 | Kikuchi et al. | 359/691 |
| 5,319,495 | 6/1994 | Yamada | 359/691 |
| 5,329,402 | 7/1994 | Sato | 359/691 |
| 5,331,464 | 7/1994 | Ito | 359/691 |
| 5,339,195 | 8/1994 | Ogata | 359/691 |
| 5,381,268 | 1/1995 | Sato | 359/691 |
| 5,452,134 | 9/1995 | Sato | 359/682 |
| 5,552,937 | 9/1996 | Ono et al. | 359/691 |
| 5,563,739 | 10/1996 | Sato | 359/691 |

*Primary Examiner*—Scott J. Sugarman
*Attorney, Agent, or Firm*—Skjerven, Morrill, MacPherson, Franklin & Friel LLP; Norman R. Klivans

[57] ABSTRACT

A wide angle zoom lens configuration which provides a compact two component lens configuration for use in an optical system such as a camera having a zoom ratio substantially over two, an angle of view of at least 94° and which is well corrected with respect to optical aberrations. Such a zoom lens includes, in order from the object side to the image side a first group of lens elements with an overall negative refractive power and a second group of lens elements with an overall positive refractive power. The first group of lens elements includes, in order from the object side, three lens elements each with a negative refractive power and a fourth meniscus shaped lens element with a positive refractive power having a convex surface facing the object side. The first group of lens elements includes at least one lens element having an aspherical surface.

34 Claims, 8 Drawing Sheets

WIDE ANGLE ZOOM LENS

This application is a continuation of application Ser. No. 08/773,504, filed Dec. 23, 1996 now abandoned.

BACKGROUND OF THE INVENTION

1. Field of the Invention

This invention relates generally to optical lens element configurations and, more particularly, to a wide angle zoom lens element configuration for use in an optical system such as a camera for use in the visible spectrum and, even more particularly, to a compact wide angle zoom lens element configuration with two moving lens element groups which has an angle of view of at least 94°, has a zoom ratio of at least 2.3, and is well corrected with respect to optical aberrations.

2. Discussion of the Related Art

One of the common problems with two group zoom lens configurations used in cameras has been the lack of compactness of the complete zoom lens configuration. For zoom lens configurations with a zoom ratio above approximately 2, the lack of compactness problem is exacerbated. In general, to achieve compactness in a two component zoom lens configuration, a greater refractive power is needed in both the negative refractive power front lens element group and the positive refractive power rear lens element group. However, this increase in refractive power usually results in increased difficulty in the correction of various optical aberrations. For example, in U.S. Pat. Nos. 4,364,641 and 4,540,249, both invented by Mogami, there are described two component wide angle zoom lens configurations which address the compactness issue. However, the zoom ratios achieved in the zoom lens configurations disclosed in those two patents are only approximately 1.75.

What is needed is a compact two component compact zoom lens configuration for use in an optical system such as a camera that has a zoom ratio substantially over 2, an angle of view of at least 94°, and is well corrected with respect to optical aberrations.

SUMMARY OF THE INVENTION

The present invention is directed to a wide angle zoom lens configuration for use in a visible spectrum optical system such as a camera system having, in order from the object side to the image side, a first group of lens elements having an overall negative refractive power and a second group of lens elements having, in order from the object side, a first lens element having a positive refractive power and having a shape factor that satisfies the condition $0<X<1.5$ and a second lens element having a positive refractive power and having a shape factor that satisfies the condition $0<X<1.5$. The shape factor of a lens element $=(r_2+r_1)/(r_2-r_1)$ where $r_1$=radius of curvature of the object side surface and $r_2$=radius of curvature of the image side surface. At least one lens element in the first group of lens elements with a negative refractive power has a shape factor that satisfies the condition $X \leq -1.9$. A lens element with a positive refractive power in the first group of lens elements has a shape factor that satisfies the condition $1 \leq X \leq 2$.

The present invention is directed to a wide angle zoom lens configuration in which the second group of lens elements also includes, in order from the object side, a contact doublet lens element, a meniscus shaped lens element having a negative refractive power and having a concave surface on the image side, a fifth lens element having a positive refractive power, and a sixth lens element having a positive refractive power.

The present invention is also directed to a wide angle zoom lens configuration in which the third lens element in the second group of lens elements is a contact doublet lens element and satisfies the condition $0.2<n_2-n_1<0.3$ where $n_1$ and $n_2$ are the indices of refraction of the first and second lens elements of the contact doublet.

The present invention is further directed to a wide angle zoom lens configuration in which the ratio of the center thickness of the fourth lens element in the second group of lens elements to the overall thickness of the second group of lens elements satisfies the condition $t_{2n}/t_{2GT}>0.2$ where $t_{2n}$ and $t_{2GT}$ are the center thickness of the fourth lens element and the total center thickness of the second group of lens elements, respectively.

The present invention is also directed to a wide angle zoom lens configuration in which the first group of lens elements has an aspherical surface.

The present invention is further directed to a wide angle zoom lens optical configuration which has a zoom ratio greater than 2.0.

The present invention is directed to a wide angle zoom lens optical configuration which has a zoom ratio of approximately 2.5.

The present invention is better understood upon consideration of the detailed description below, in conjunction with the accompanying drawings. As will become readily apparent to those skilled in this art from the following description there is shown and described embodiments of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The accompanying drawings incorporated in and forming a part of the specification, illustrate the present invention, and together with the detailed description below serve to explain the principles of the invention. In the drawings.

DETAILED DESCRIPTION

Figure 1A:
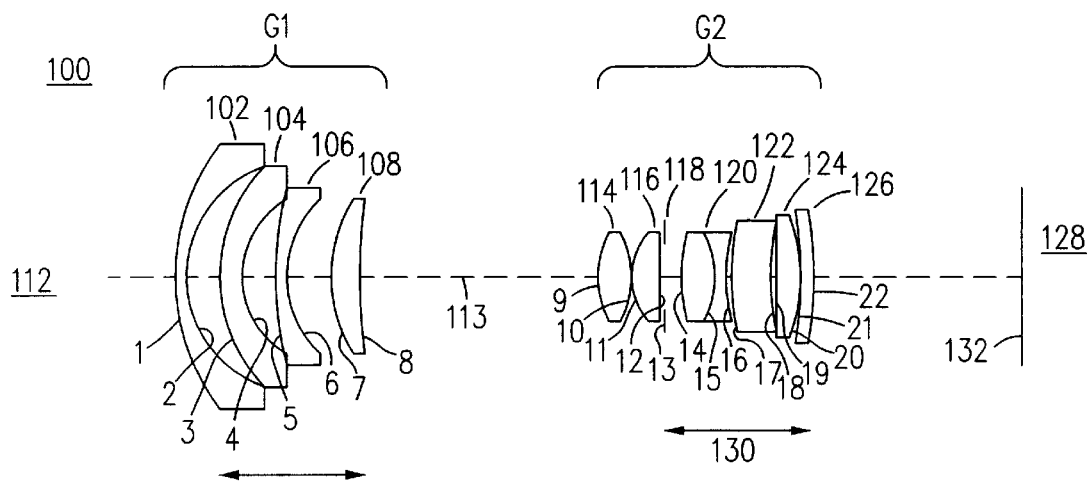
FIGS. 1A–1C shows longitudinal views of a first embodiment of the zoom lens configuration of the present invention in the wide angle position, the middle angle position, and the telephoto position.
Figure 1B:
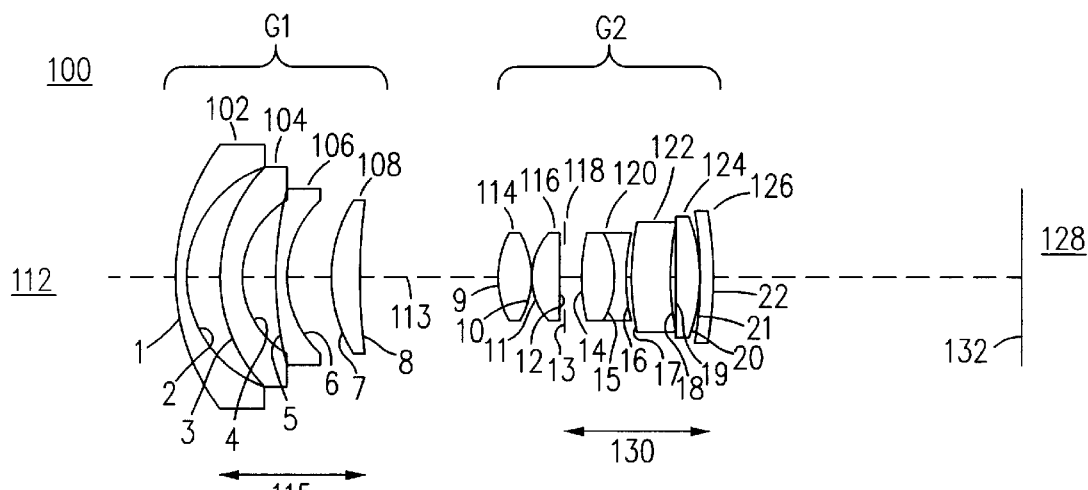
Figure 1C:
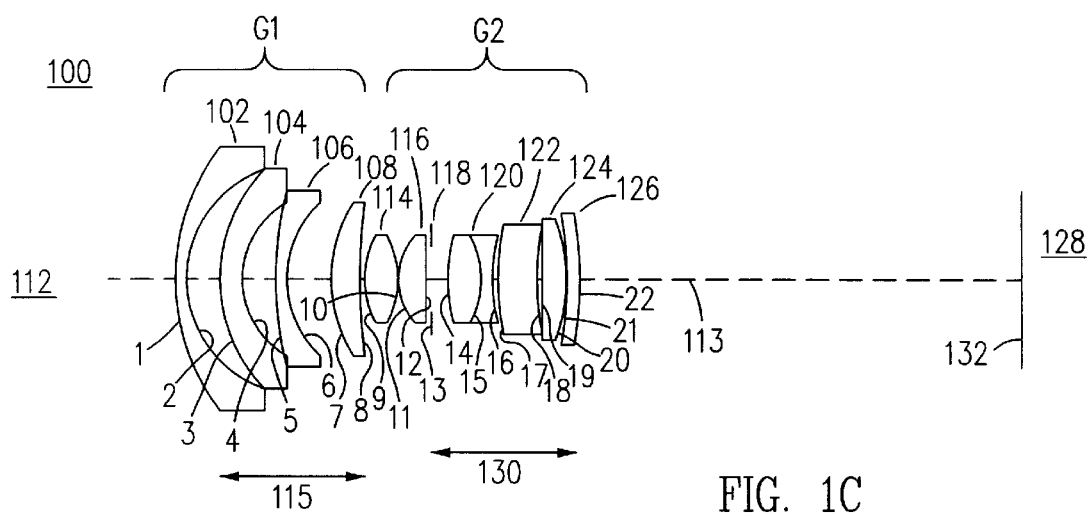

Referring now to the FIGS., the embodiments of the present invention will now be described. FIGS. 1A–1C show a two group zoom lens configuration according to a first embodiment of the present invention. The two group zoom lens configuration is shown in the wide angle position, the middle angle position, and the telephoto position. The two group lens configuration has an angle of view greater than 94° and has a zoom ratio of at least 2.3. Those skilled in the art will readily appreciate that a zoom lens having a zoom ratio of 2.3 is typically marketed and sold as having a zoom ratio of 2.5. This is because 2.5 is a "standard" value and intermediate or nonstandard values are not used. The greater the angle of view the more desirable the optical system to the end user because the wider angle of view makes the zoom configuration more usable. The zoom ratio is defined as the focal length of the lens configuration when in the telephoto position divided by the focal length of the lens configuration when in the wide angle position, $f_T/f_W$ where $f_T$=the focal length of the lens configuration when in the telephoto position and $f_W$=the focal length of the lens configuration when in the wide angle position. According to standard practice in the optical art, drawings of optical system lens configurations, such as those shown in the FIGS. 1A–2C, have the object space, defined as all the space from the first surface of the first lens element of a lens element configuration towards the object and beyond, shown on the left in the drawing. The image space, defined as all the space from the last surface of the last lens element in the lens element configuration towards the image and beyond, is shown on the right side of the drawing. In addition, each surface of each lens element is numbered consecutively from the object side to the image side. As will be discussed below, a contact doublet lens element is considered to only have three surfaces with the two surfaces in contact considered to be one surface. Also, in the embodiments discussed herein, each embodiment includes a stop which is numbered consecutively.

It is also noted that a conventional zoom mechanism and a mounting structure for the lens elements are not depicted.

The two group zoom lens configuration 100 shown in FIGS. 1A–1C viewed from the object side, in order of succession, includes a first group of lens elements G1 with an overall negative refractive power and a second group of lens elements G2 with an overall positive refractive power.

The first group of lens elements G1 includes, in order from the object side, three lens elements 102, 104, and 106 each having a negative refractive power and a meniscus shaped lens element 108 having a positive refractive power. The meniscus shaped lens element 108 has the convex surface 7 facing toward the object space, indicated generally at 112. The first group of lens elements G1 includes at least one aspherical surface. One such aspherical surface could be, for example, surface 3 on lens element 104. The aspherical surface 3 is used to primarily correct negative distortion and is most effective when located in the first group of lens elements G1 where the imaging ray bundle utilizes a great portion of the lens surface to image a full field view. The shape of the aspherical surface can be expressed as follows:

$$x=[(1/R)h^2]/[1+\{1-(1+k)(1/R)^2h^2\}^{1/2}]+A_1h^4+A_2h^6+A_3h^8+A_4h^{10}$$

where the x-axis is in the optical axis direction, the h-axis is in a direction orthogonal to the optical axis, the direction of a ray is positive, R is the paraxial radius of curvature, and the aspherical surface coefficients are $A_1, A_2, A_3$, and $A_4$, and k is the conic constant. A representative set of aspherical coefficients and a conic constant is provided in conjunction with Example 1, discussed below. The first group of lens elements G1 is movable along the optical axis 113 as indicated by the double-ended arrow 115. The first group of lens elements G1 serves as the compensator in the two component zoom lens configuration and is used to maintain a fixed image position. The first group of lens elements G1 is also used to focus the zoom lens configuration as the distance to the object is varied, either by movement of the object with respect to the zoom lens configuration or by movement of the zoom lens configuration with respect to the object.

The second group of lens elements G2 includes, in order from the object side, a first lens element 114 having a positive refractive power, a second lens element 116 having a positive refractive power, an adjustable diaphragm 118, a third lens element 120 which is a meniscus cemented doublet lens element having a negative refractive power and having the concave side 16 facing the image side, indicated generally at 128, a fourth lens element 122 which is a singlet meniscus lens element having a negative refractive power and having the concave side 18 facing the image side 128, a fifth lens element 124 having a positive refractive power, and a sixth lens element 126 having a positive refractive power. The second group of lens elements G2 is movable along the optical axis 113 as indicated by the double-ended arrow 130. The second group of lens elements G2 serves as the variator and is translated along the optical axis 113 away from the image plane, indicated at 132, to change the focal length of the zoom lens configuration from the short focal length position to the long focal length position.

Figure 2A:
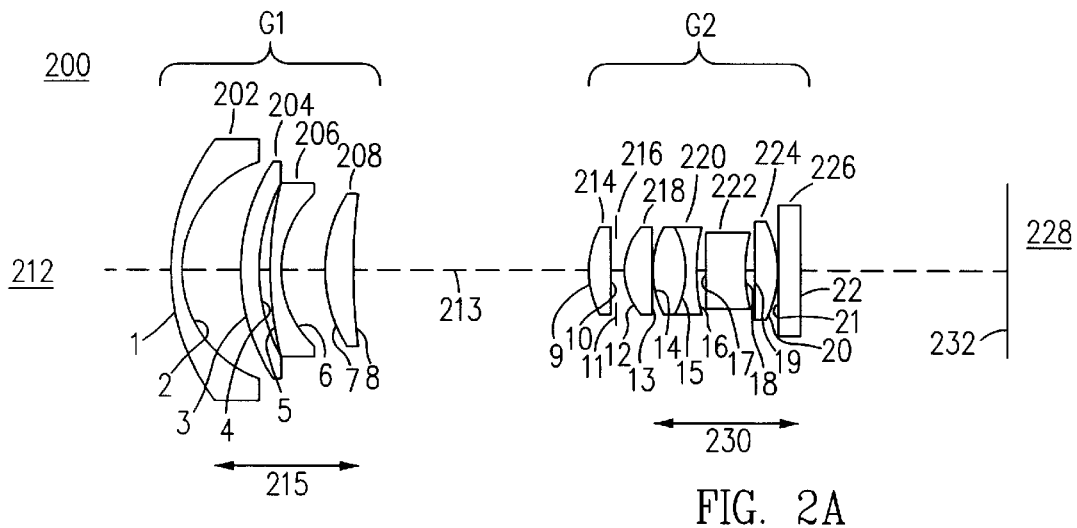
FIG. 2A–2C shows longitudinal views of a second embodiment of the zoom lens configuration of the present invention in the wide angle position, the middle angle position, and the telephoto position.
Figure 2B:
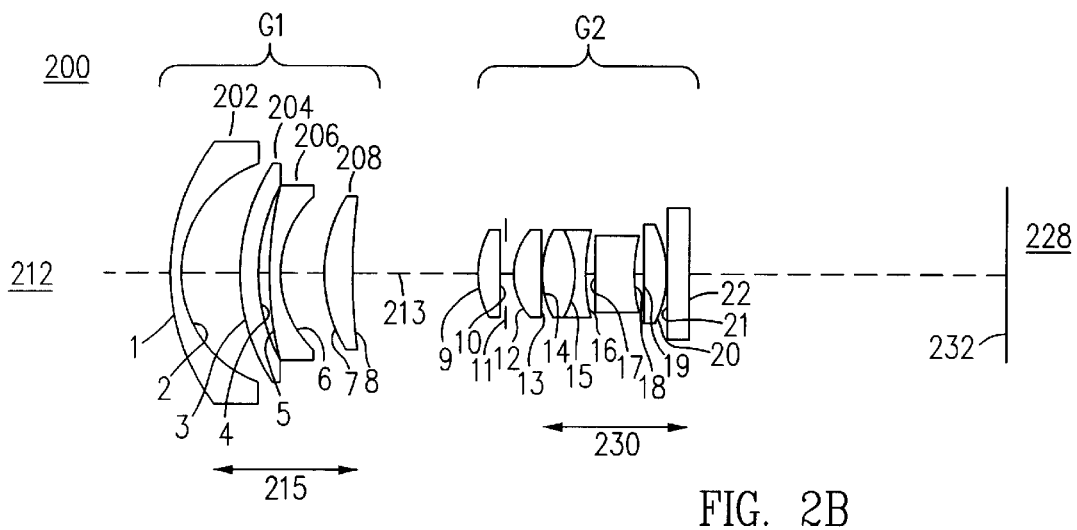
Figure 2C:
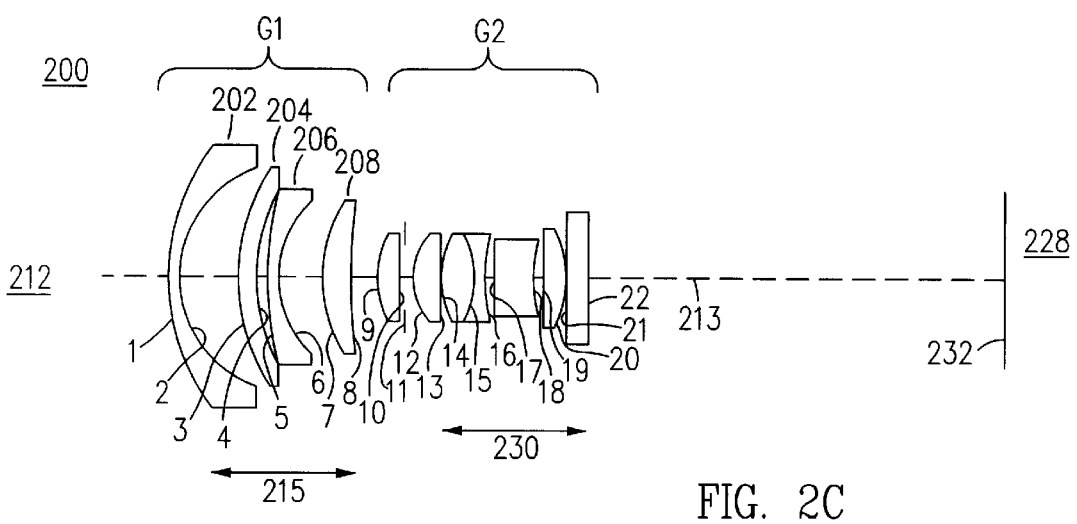

Referring now to FIGS. 2A–2C there is shown a two group zoom lens configuration according to a second embodiment of the present invention. The two group lens configuration according to the second embodiment also has an angle of view greater than 94° and a zoom ratio of at least 2.3. The two group lens configuration 200 shown in FIGS. 2A–2C, viewed from the object side, in order of succession, includes a first group of lens elements G1 having an overall negative refractive power and a second group of lens elements G2 having an overall positive refractive power.

The first group of lens elements G1 includes, in order from the object side, three lens elements 202, 204, and 206 each having a negative refractive power and a meniscus shaped lens element 208 having a positive refractive power. The meniscus shaped lens element 208 has the convex surface 7 facing toward the object space, indicated generally at 212. The first group of lens elements G1 includes at least one aspherical surface. One such aspherical surface could be, for example, surface 2 on lens element 202. The aspherical surface is used primarily to correct negative distortion and is most effective when located in the first group of lens elements G1 where the imaging ray bundle utilizes a great portion of the lens element surface to image a full field view. The shape of the aspherical surface can be expressed as follows:

$$x=[(1/R)h^2]/[1+\{1-(1+k)(1/R)^2h^2\}^{1/2}]+A_1h^4+A_2h^6+A_3h^8+A_4h^{10}$$

where the x-axis is in the optical axis direction, the h-axis is in a direction orthogonal to the optical axis, the direction of a ray is positive, R is the paraxial radius of curvature, and the aspherical surface coefficients are $A_1, A_2, A_3$, and $A_4$ and k is the conic constant. A representative set of aspherical surface coefficients and a conic constant is provided with Example 2. The first group of lens elements G1 is movable along the optical axis 213 as indicated by the double-ended arrow 215. The first group of lens elements G1 serves as the compensator in the two component zoom lens configuration and is used to maintain a fixed image position. The first group of lens elements G1 is also used to focus the zoom lens configuration as the distance to the object is varied, either by movement of the object with respect to the zoom lens configuration or by movement of the zoom lens configuration with respect to the object.

The second group of lens elements G2 includes, in order from the object side, a first lens element 214 with a positive refractive power, an adjustable diaphragm 216, a second lens element 218 with a positive refractive power, a third lens element 220 which is a meniscus cemented doublet lens element having a negative refractive power and having a concave surface 16 facing the image side, indicated generally at 228, a fourth lens element 222 which is a singlet meniscus lens element having a negative refractive power and having the concave surface 18 facing the image space 228, a fifth lens element 224 having a positive refractive power, and a sixth lens element 226 having a positive refractive power. The second group of lens elements G2 is movable along the optical axis 213 as indicated by the double-ended arrow 230. The second group of lens elements G2 serves as the variator and is translated along the optical axis 213 away from the image plane, indicated at 232 to change the focal length of the system from the short focal length position to the long focal length position.

The two group zoom lens configuration of the present invention also satisfies the following conditions which apply to both embodiments described above:

$0 < X < 1.5$, $0.2 < n_2 - n_1 < 0.3$, and $t_{2n}/t_{2GT} > 0.2$, where X is the shape factors of the first and second lens elements 114 and 116 (lens elements 214 and 218 in the second embodiment shown in FIGS. 2A–2C), in the second group of lens elements G2, $n_1$ and $n_2$ are the indices of refraction of the first and second lens elements of the cemented doublet lens element 120 (cemented doublet lens element 220 in the second embodiment shown in FIGS. 2A–2C) in the second group of lens elements G2, $t_{2n}$ and $t_{2GT}$ are the center thicknesses of the negative meniscus singlet lens element 122 (the negative meniscus singlet lens element 222 in the second embodiment shown in FIGS. 2A–2C) and the total center thickness of the second group of lens elements G2. The shape factors of a lens element=$(r_2 + r_1)/(r_2 - r_1)$ where $r_1$=radius of curvature of the object side surface and $r_2$=radius of curvature of the image side surface. The shape factor of a lens element determines how much aberration is generated by the lens element. The shape factor of a lens element are used to purposely generate aberrations in a particular lens element to compensate for aberrations that are occurring in another lens element in the lens configuration. When the factor $n_2 - n_1$ is less than the lower limit in the equation $0.2 < n_2 - n_1 < 0.3$, spherical aberration is undercorrected when the zoom lens configuration is in the telephoto position and lateral color is difficult to correct. When the factor $n_2 - n_1$ is greater than the upper limit in the equation $0.2 < n_2 - n_1 < 0.3$, spherical aberration is overcorrected when the zoom lens configuration is in the telephoto position. When the factor $t_{2n}/t_{2GT}$ is less than 0.2, astigmatism is undercorrected when the zoom lens configuration is in the telephoto position and coma is overcorrected when the zoom lens configuration is in the wide angle position.

The angle of view greater than 94° in both of the embodiments described above is accomplished through the control of lens element shapes in the first group of lens elements G1. In order to achieve an angle of view greater than 90°, the first group of lens elements G1 contains at least one lens element having negative refractive power and one lens element with a positive refractive power. Preferably a second lens element in the first group of lens elements G1 having a negative refractive power and each of the two lens elements having a negative refractive power have shape factors which satisfy:

$X \leq -1.9$ where X=lens element shape factor defined above.

Referring to FIG. 1A the selection of the lens elements having negative refractive power can be made from lens elements 102, 104, or 106. Referring to FIG. 2A the selection of the lens elements having negative refractive power can be made from lens elements 202, 204, or 206.

In addition, the lens element with a positive refractive power in the first group of lens elements G1 has a shape factor which satisfies:

$1 \leq X \leq 2$ where X=lens element shape factor defined above.

Referring to FIG. 1A the selection of the lens element having a positive refractive power is lens element 108 and in FIG. 2A the selection of the lens element having a positive refractive power is lens element 208.

If lens elements with a negative refractive power in the first group of lens elements G1 have shape factors >−1.9, large angles of view become extremely difficult to achieve as aberration corrections, especially distortion correction, become more difficult. If the shape factor of the lens element with a positive refractive power is <1, aberration correction, especially coma and astigmatism correction, becomes difficult. If the shape factor of the lens element with a positive refractive power is >2, aberration correction, especially spherical aberration and astigmatism correction, becomes difficult when the zoom lens configuration is in the wide angle position.

It is important in a two group zoom lens configuration that there is good independent aberration correction in the first group of lens elements G1 and the second group of lens elements G2. The first group of lens elements G1 achieves good aberration correction by dividing the negative refractive optical power between the first three negative lens elements, 102, 104, and 106 (lens elements 202, 204, and 206 in the second embodiment shown in FIGS. 2A–2C) and then using a fourth lens element 108 (lens element 208 in the second embodiment shown in FIGS. 2A–2C) having a positive refractive power to balance spherical aberration and to provide chromatic aberration correction.

The second group of lens elements G2 achieves good aberration correction by (1) controlling the shape factor of the two lens elements 114 and 116 (the lens elements 214 and 218 in the second embodiment shown in FIGS. 2A–2C) which have positive refractive power, (2) a judicious choice of the glasses which are used to construct the contact doublet lens element 120 (220 in the second embodiment shown in FIGS. 2A–2C), and (3) the careful selection and control of both the shape and thickness of the negative meniscus singlet lens element 122 (lens element 222 in the second embodiment shown in FIGS. 2A–2C). The glasses that are used in a contact doublet lens element are selected to correct lateral chromatic aberration. To do this the glasses are selected to have large dispersion differences, that is, the Abbe-numbers have relatively great different values.

Spherical aberration generated by the second group of lens elements G2 is reduced by splitting the optical power between the two positive refractive power lens elements 114 and 116 (lens elements 214 and 218 in the second embodiment shown in FIGS. 2A–2C) and controlling the shape factor of the two lens elements according to the following equation: $0 < X < 1.5$.

When this conditions is satisfied, good aberration correction is achievable. When the shape factor X of lens element 114 (FIGS. 1A–1C) or 214 (FIGS. 2A–2C) is less than the lower limit of the equation $0 < X < 1.5$, spherical aberration is overcorrected when the zoom lens configuration is in the telephoto position. When the shape factor X of lens element 114 (FIGS. 1A–1C) or 214 (FIGS. 2A–2C) is greater than the upper limit of the equation 0<X<1.5, spherical aberration is undercorrected when the zoom lens configuration is in the telephoto position. When the shape factor X of lens element 116 (FIGS. 1A–1C) or 218 (FIGS. 2A–2C) is less than the lower limit of the equation 0<X<1.5, coma aberration is undercorrected when the zoom lens configuration is in the telephoto position. When the shape factor X of lens element 116 (FIGS. 1A–1C) or 218 (FIGS. 2A–2C) is greater than the upper limit of the equation 0<X<1.5, spherical aberration is undercorrected when the zoom lens configuration is in the telephoto position.

Example 1 is a listing of numerical values for the embodiment shown in FIG. 1A–1C. The optical surfaces are numbered from the object side to the image side, each lens element having two surfaces. In the case of the contact doublet lens element 120 the contact surfaces are considered a single surface, therefore the two elements that make up the contact doublet lens element are considered having only three surfaces, the two outer surfaces and the single contact surface. The zoom lens configuration of Example 1 has a 20.5 millimeter to 48.5 millimeter focal length zoom.

EXAMPLE 1

| Surface | Radius of curvature (mm) | Thickness (mm) | GLA*** |
|---|---|---|---|
| 1 | 55.78230 | 2.000 | 772.494 |
| 2 | 23.10240 | 4.886 | |
| 3* | 41.67850 | 2.000 | 796.409 |
| 4 | 22.20730 | 6.589 | |
| 5 | 88.21570 | 2.000 | 734.511 |
| 6 | 29.33650 | 4.715 | |
| 7 | 33.50980 | 5.000 | 804.255 |
| 8 (20.5 mm)** | 126.98130 | 34.190 | |
| 8 (35.0 mm)** | 126.98130 | 10.372 | |
| 8 (48.5 mm)** | 126.98130 | 1.000 | |
| 9 | 54.58950 | 3.000 | 519.700 |
| 10 | -98.34860 | 0.500 | |
| 11 | 28.55870 | 3.200 | 517.642 |
| 12 | 483.85950 | 1.000 | |
| 13 | INFINITY | 1.841 | |
| 14 | 47.24990 | 6.000 | 540.596 |
| 15 | -24.34660 | 2.000 | 796.409 |
| 16 | 54.66270 | 0.875 | |
| 17 | 199.47450 | 6.500 | 804.255 |
| 18 | 28.01330 | 1.389 | |
| 19 | 131.37000 | 3.700 | 532.490 |
| 20 | -25.90230 | 0.500 | |
| 21 | -343.75510 | 2.900 | 519.700 |
| 22 (20.5 mm)** | 2.80660 | 38.251 | |
| 22 (35.0 mm)** | 2.80660 | 55.056 | |
| 22 (48.5 mm)** | 2.80660 | 70.702 | |

*Aspheric coefficients:
k = 0.078000    $A_1$ = 0.628100E-05
$A_2$ = 0.859700E-08    $A_3$ = -.162400E-10
$A_4$ = 0.537900E-13
**The values 20.5 mm, 35.0 mm, and 48.5 mm are the effective focal lengths of the zoom lens configuration in the wide angle, middle, and telephoto positions, respectively. The thickness values indicate the air distance between the indicated surface and the next significant optical surface. In the case of surface 8, the air thickness is between surface 8 and surface 9. In the case of surface 22, the air thickness is between surface 22 and the image plane.
***GLA = Glass type. The 6 digit identification code represents the index of refraction (first 3 digits + 1 = index of refraction) and the last three digits divided by 10 = Abbe number also known as the V-number which represents the dispersion value of the lens element. For example, 772.494 from surface 1 represents an index of refraction of 1.772 (.772 + 1) and an Abbe number of 49.4 (494/10).

Figure 3A:
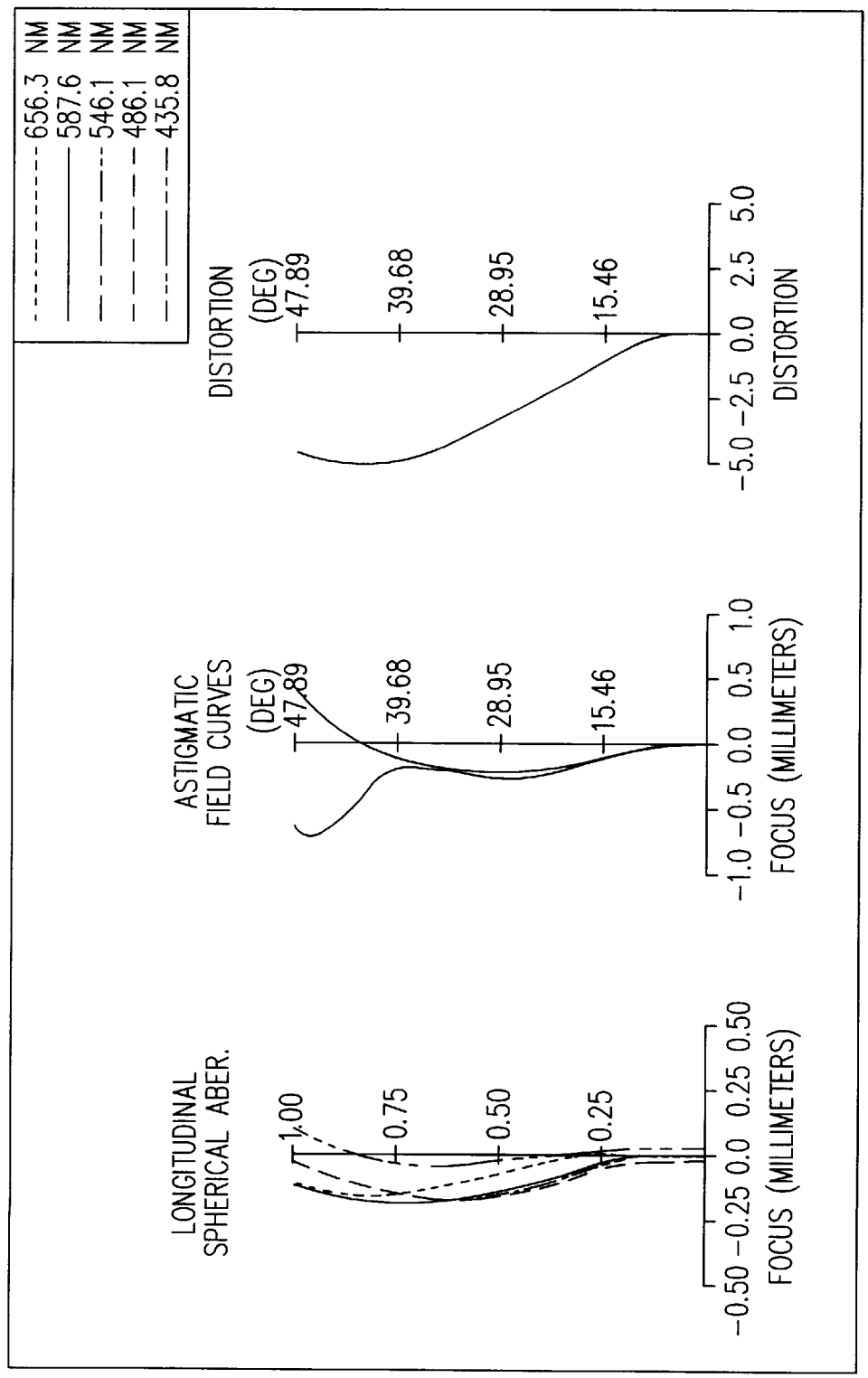
FIGS. 3A–3C show selected optical aberration performance data of the embodiment of the present invention shown in FIGS. 1A–1C.
Figure 3B:
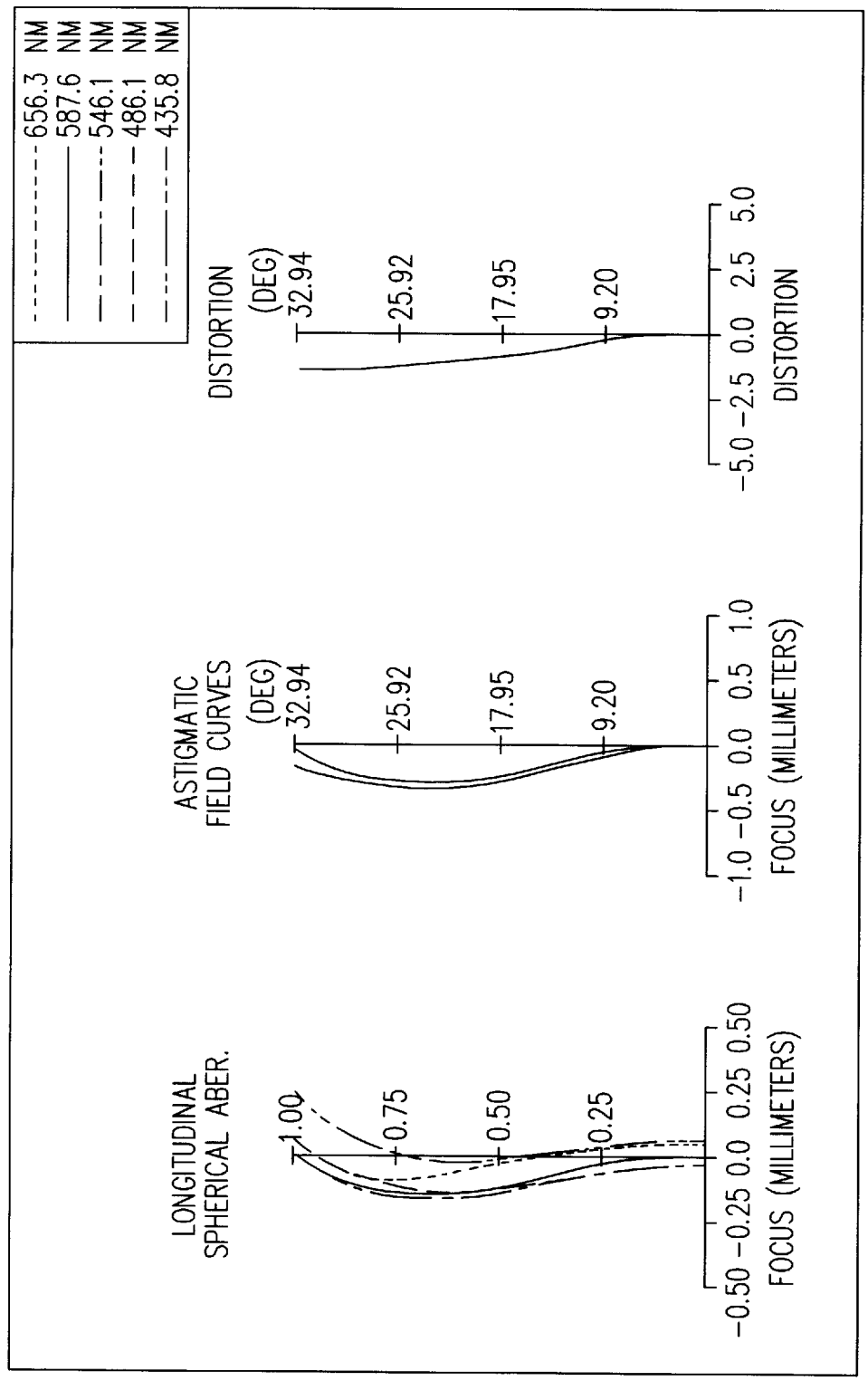
Figure 3C:
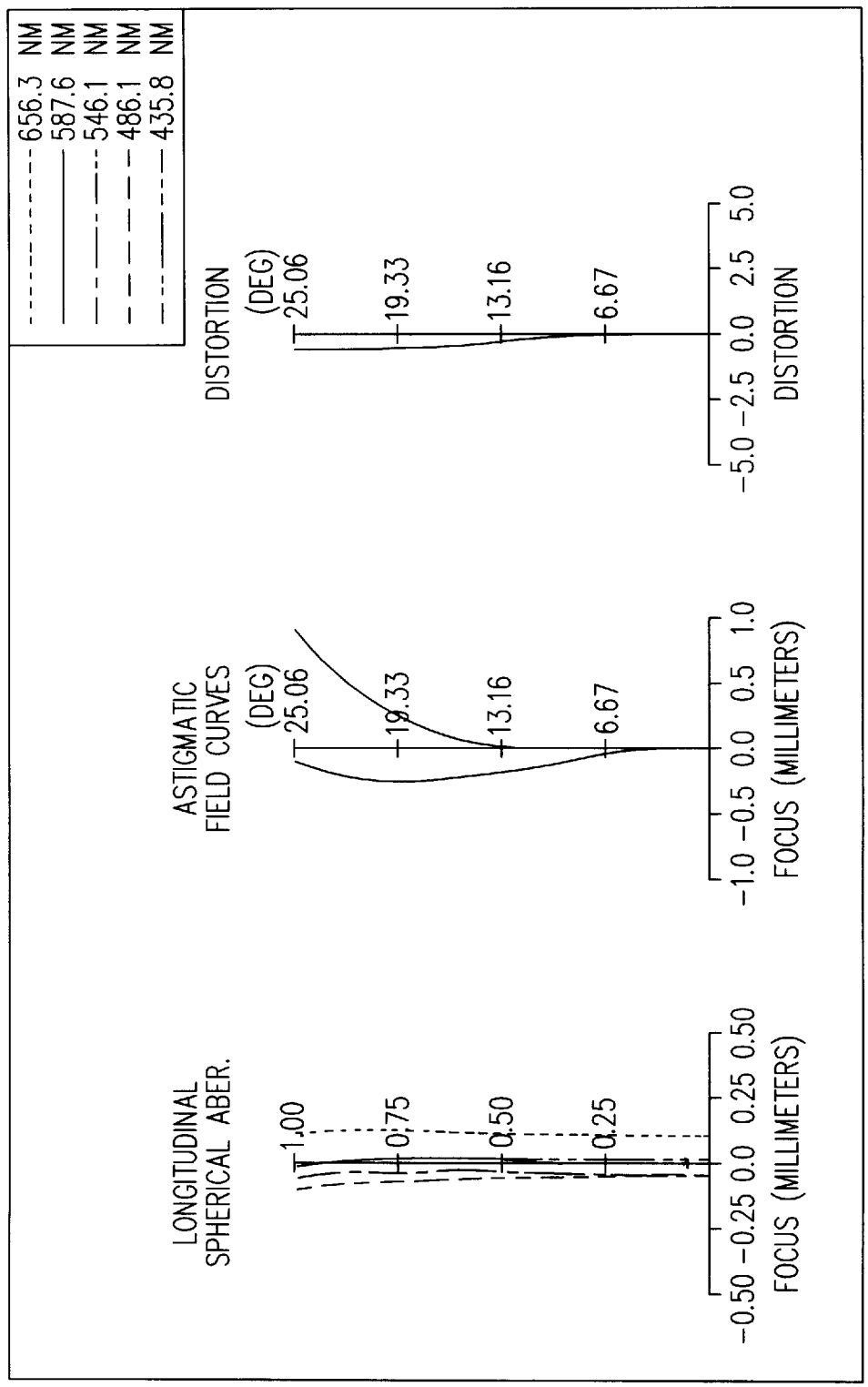

Referring to FIGS. 3A–3C there is shown the longitudinal spherical aberration, the astigmatic field curves, and the distortion for the three positions of the zoom lens configuration of the first embodiment as shown in FIGS. 1A–1C, respectively. That is, FIG. 3A shows the longitudinal spherical aberration, the astigmatic field curves, and the distortion for the zoom lens configuration in the wide angle position as shown in FIG. 1A, FIG. 3B shows the longitudinal spherical aberration, the astigmatic field curves, and the distortion for the zoom lens configuration in the medium angle position as shown in FIG. 1B, and FIG. 3C shows the longitudinal spherical aberration, the astigmatic field curves, and the distortion for the zoom lens configuration in the medium angle position as shown in FIG. 1C.

Example 2 is a listing of numerical values for Embodiment 2 shown in FIG. 2A–2C. The optical surfaces are numbered from the object side to the image side, each lens element having two surfaces. In the case of the contact doublet lens element the contact surfaces are considered a single surface, therefore the two elements that make up the contact doublet lens element are considered having only three surfaces, the two outer surfaces and the single contact surface. The zoom lens configuration of Example 2 has a 20.5 millimeter to 48.5 millimeter focal length zoom.

EXAMPLE 2

| Surface | Radius of curvature (mm) | Thickness (mm) | GLA*** |
|---|---|---|---|
| 1 | 61.32250 | 2.000 | 767.468 |
| 2* | 19.39020 | 6.698 | |
| 3 | 36.65560 | 2.000 | 734.511 |
| 4 | 28.84020 | 5.532 | |
| 5 | 473.98000 | 2.000 | 697.556 |
| 6 | 35.57420 | 5.639 | |
| 7 | 40.10360 | 4.800 | 804.255 |
| 8 (20.5 mm)** | 188.40810 | 35.524 | |
| 8 (35.0 mm)** | 188.40810 | 11.782 | |
| 8 (49.5 mm)** | 188.40810 | 2.438 | |
| 9 | 29.03910 | 3.500 | 564.607 |
| 10 | 421.97800 | 1.000 | |
| 11 | INFINITY | 1.000 | |
| 12 | 45.61010 | 2.800 | 517.642 |
| 13 | 555.90970 | 0.500 | |
| 14 | 30.13000 | 4.000 | 518.602 |
| 15 | -29.15470 | 2.000 | 767.468 |
| 16 | 158.14520 | 0.775 | |
| 17 | 591.94780 | 8.700 | 804.255 |
| 18 | 20.99880 | 1.386 | |
| 19 | 91.27150 | 3.400 | 532.490 |
| 20 | -30.29220 | 0.500 | |
| 21 | 170.16160 | 3.000 | 518.589 |
| 22 (20.5 mm)** | -200.89630 | 37.945 | |
| 22 (35.0 mm)** | -200.89630 | 54.591 | |
| 22 (48.5 mm)** | -200.89630 | 70.089 | |

*Aspheric coefficients:
k = -0.315500
$A_1$ = -.118300E-05    $A_2$ = -.145700E-07
$A_3$ = 0.513700E-10    $A_4$ = -.114900E-12
**The values 20.5 mm, 35.0 mm, and 48.5 mm are the effective focal lengths of the zoom lens configuration in the wide angle, middle, and telephoto positions, respectively. The thickness values indicate the air distance between the indicated surface and the next significant optical surface. In the case of surface 8, the air thickness is between surface 8 and surface 9. In the case of surface 22, the air thickness is between surface 22 and the image plane.
***GLA = Glass type. The 6 digit identification code represents the index of refraction (first 3 digits + 1 = index of refraction) and the last three digits divided by 10 = Abbe number which is defined above.

Figure 4A:
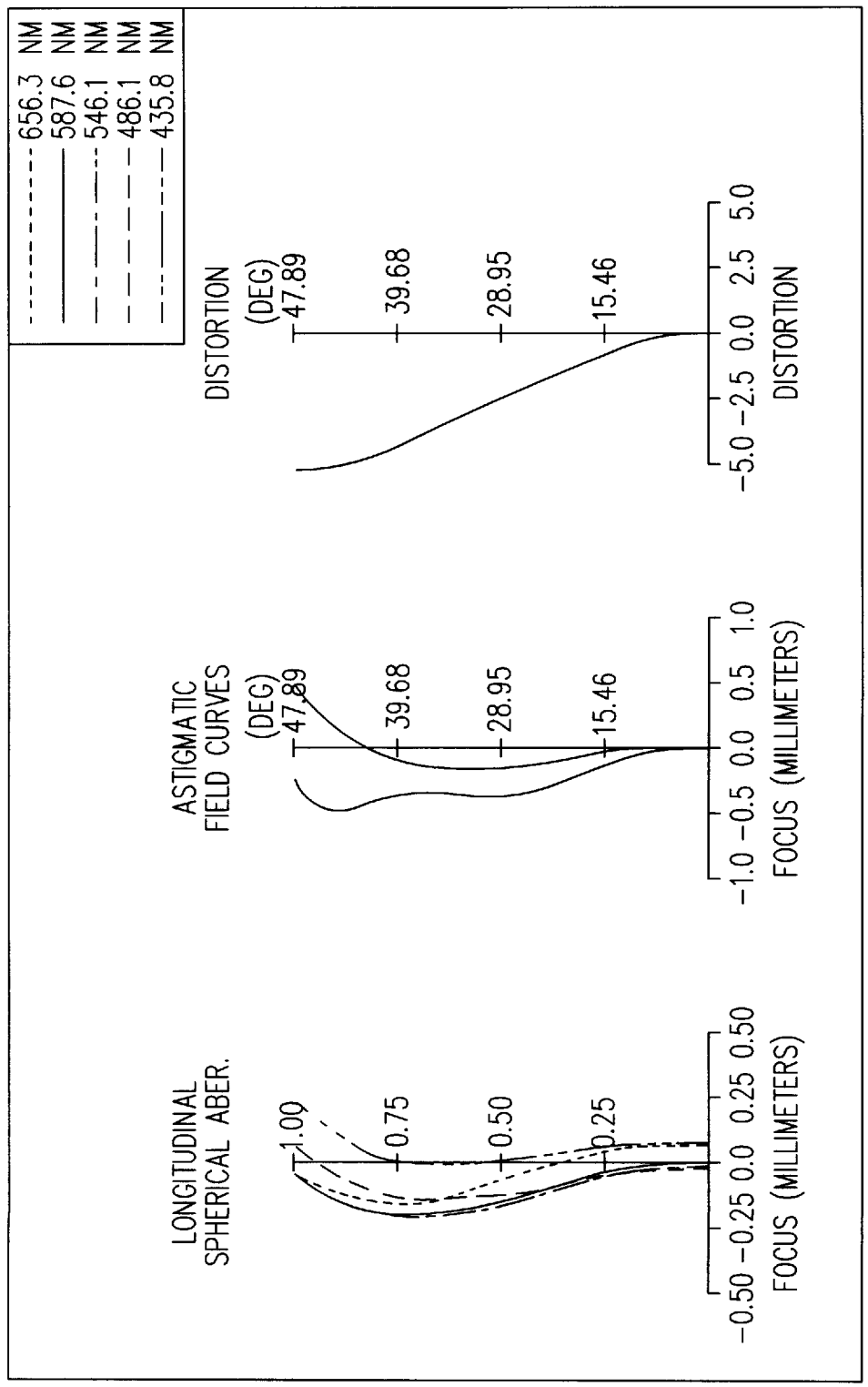
FIGS. 4A–4C show selected optical aberration performance data of the embodiment of the present invention shown in FIGS. 2A–2C.
Figure 4B:
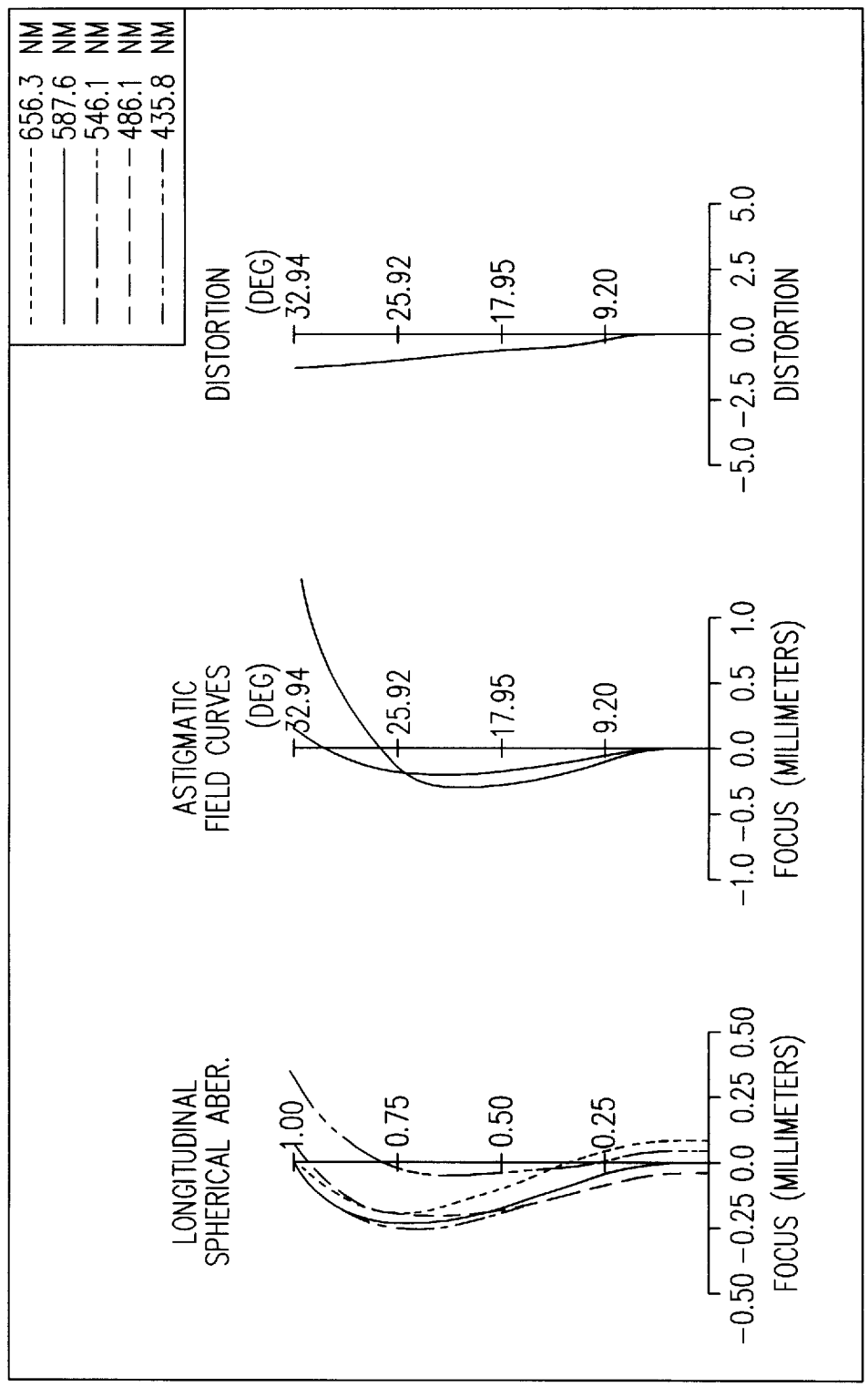
Figure 4C:
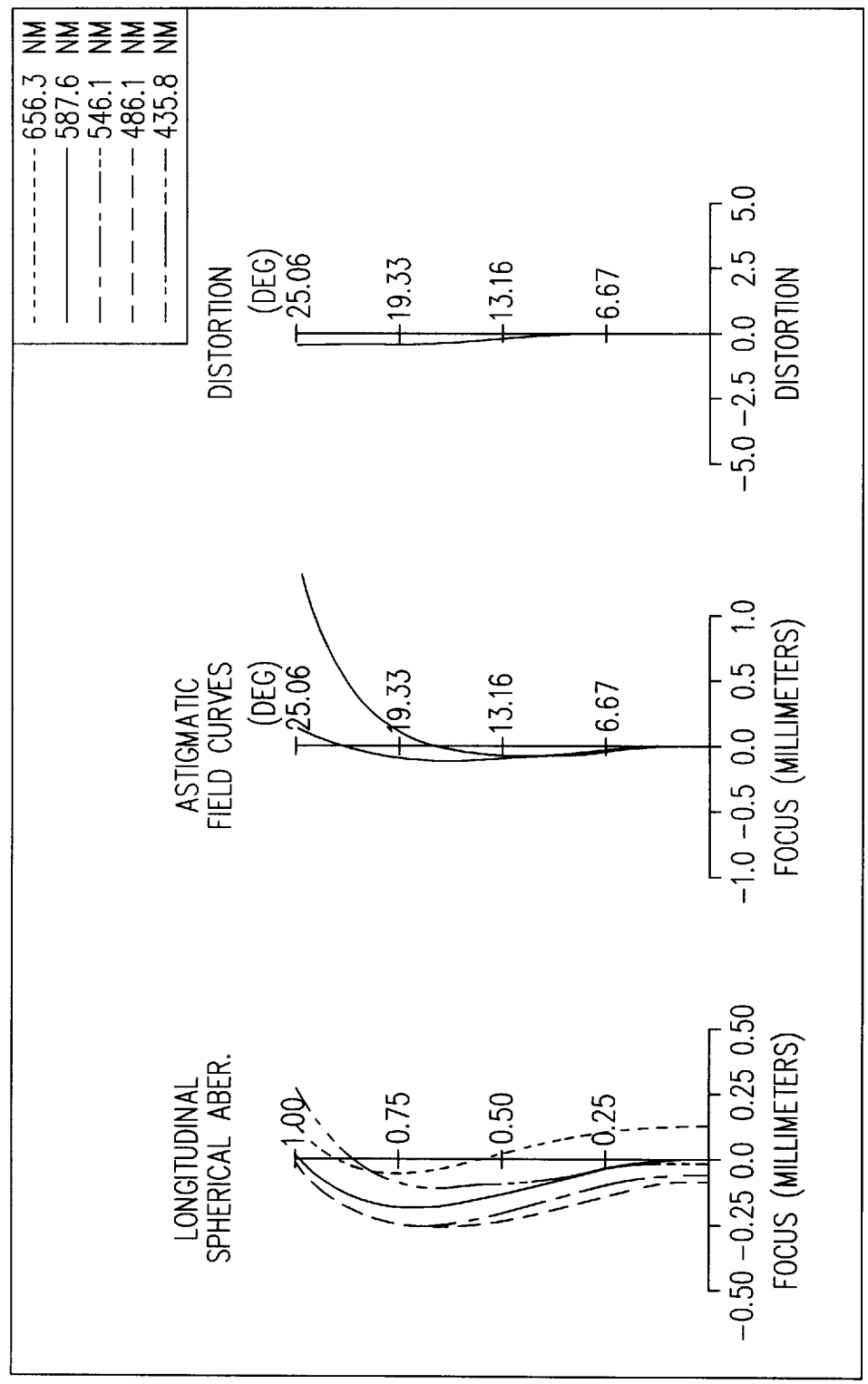

Referring to FIGS. 4A–4C there is shown the longitudinal spherical aberration, the astigmatic field curves, and the distortion for the three positions of the zoom lens configuration of the first embodiment as shown in FIGS. 2A–2C, respectively. That is, FIG. 4A shows the longitudinal spherical aberration, the astigmatic field curves, and the distortion for the zoom lens configuration in the wide angle position as shown in FIG. 2A, FIG. 4B shows the longitudinal spherical aberration, the astigmatic field curves, and the distortion for the zoom lens configuration in the medium angle position as shown in FIG. 2B, and FIG. 4C shows the longitudinal spherical aberration, the astigmatic field curves, and the distortion for the zoom lens configuration in the medium angle position as shown in FIG. 2C.

The foregoing description of the embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What I claim is:

1. A zoom lens configuration comprising, in order from an object side to an image plane:
    a first group of lens elements movable with respect to the image plane and having an overall negative refractive power;
    a second group of lens elements movable with respect to the image plane and having an overall positive refractive power and comprising in order from the object side;
    a first lens element having a positive refractive power and having a shape factor X that satisfies the condition:
    $0<X<1.5$;
    a second lens element having a positive refractive power and having a shape factor X that satisfies the condition:
    $0<X<1.5$;
    at least one lens element having a negative refractive power in the first group of lens elements having a shape factor X that satisfies the condition:
    $X \leq -1.9$; and
    a lens element having a positive refractive power in the first group of lens elements having a shape factor X that satisfies the condition:
    $1 \leq X \leq 2$.

2. The zoom lens configuration of claim 1, further comprising at least a second lens element in the first group of lens elements having a negative refractive power having a shape factor X that satisfies the condition:
    $X \leq -1.9$.

3. The zoom lens configuration of claim 2, wherein the second group of lens elements further comprises from the object side:
    a third lens element comprising a contact doublet lens element;
    a fourth lens element comprising a meniscus shaped lens element having a negative refractive power and having a concave surface on the image plane side;
    a fifth lens element having a positive refractive power; and
    a sixth lens element having a positive refractive power.

4. The zoom lens configuration of claim 3, wherein the third lens element in the second group of lens elements is a contact doublet lens element and satisfies the condition:
    $0.2<n_2-n_1<0.3$,
    wherein $n_1$ and $n_2$ are the indices of refraction of the first and second lens elements, respectively, of the contact doublet lens element.

5. The zoom lens configuration of claim 4, wherein the ratio of the center thickness $t_{2n}$ of the fourth lens element in the second group of lens elements to the overall thickness $t_{2GT}$ of the second group of lens elements satisfies the condition:
    $t_{2n}/t_{2GT}>0.2$.

6. The zoom lens configuration of claim 5, wherein the first group of lens elements includes a lens element having an aspherical surface.

7. The zoom lens configuration of claim 1 having a zoom ratio greater than 2.0.

8. The zoom lens configuration of claim 1, having a zoom ratio of approximately 2.5.

9. The zoom lens configuration of claim 1 having an angle of view greater than 90°.

10. The zoom lens configuration of claim 1, having an angle of view of approximately 94°.

11. A method of achieving a zoom ratio substantially over two, an angle of view of at least 94° and well corrected optical aberrations in a compact two component lens configuration, the method comprising:
    passing light through a first group of lens elements which are movable with respect to an image plane and having an overall negative refractive power;
    passing the light through a first lens element in a second group of lens elements which are moveable with respect to the image plane, wherein the first lens element has a positive refractive power and has a shape factor X that satisfies the condition:
    $0<X<1.5$;
    passing the light through a second lens element in the second group of lens elements, wherein the second lens element has a positive refractive power and has a shape factor X that satisfies the condition:
    $0<X<1.5$;
    passing the light through at least one lens element in the first group of lens elements which has a negative refractive power and which has a shape factor X that satisfies the condition:
    $X \leq -1.9$; and
    passing the light through a lens element in the first group of lens elements which has a positive refractive power and which has a shape factor X that satisfies the condition:
    $1 \leq X \leq 2$.

12. The method of claim 11, wherein the method further comprises passing the light through at least a second lens element in the first group of lens elements, wherein the at least a second lens element has a negative refractive power and has a shape factor X that satisfies the condition:
    $X \leq -1.9$.

13. The method of claim 12, wherein the method further comprises:
    passing the light through a contact doublet lens element in the second group of lens elements wherein the contact doublet lens satisfies the following condition:
    $0.2<n_2-n_1<0.3$,
    wherein $n_1$ and $n_2$ are the indices of refraction of the first and second lens elements, respectively, of the contact lens element;

passing the light through a third lens element comprising a meniscus shaped lens element in the second group of lens elements, wherein the meniscus shaped lens element has a negative refractive power and has a concave surface on the image plane side;

passing the light through a fourth lens element in the second group of lens elements which has a positive refractive power and wherein the ratio of the center thickness $t_{2n}$ of the fourth lens element to the overall thickness $t_{2GT}$ of the second group of lens elements satisfies the condition:

$t_{2n}/t_{2GT} > 0.2$; and passing the light through a lens element in the second group of lens elements which has a positive refractive power.

14. The method of claim 13, further comprising passing the light through a lens element in the first group of lens elements having an aspherical surface.

15. A zoom lens configuration comprising, in order from an object side to an image plane:

a first group of lens elements movable with respect to the image plane and having an overall negative refractive power;

a second group of lens elements movable with respect to the image plane and having an overall positive refractive power and comprising in order from the object side;

a first lens element having a positive refractive power and having a shape factor X that satisfies the condition: 0<X<1.5;

a second lens element having a positive refractive power, at least one lens element having a negative refractive power in the first group of lens elements; and a lens element having a positive refractive power in the first group of lens elements.

16. The zoom lens configuration of claim 15, further comprising at least a second lens element in the first group of lens elements having a negative refractive power having a shape factor X that satisfies the condition:

$X \leq -1.9$.

17. The zoom lens configuration of claim 16, wherein the second group of lens elements further comprises from the object side:

a third lens element comprising a contact doublet lens element;

a fourth lens element comprising a meniscus shaped lens element having a negative refractive power and having a concave surface on the image plane side;

a fifth lens element having a positive refractive power; and a sixth lens element having a positive refractive power.

18. The zoom lens configuration of claim 17, wherein the third lens element in the second group of lens elements is a contact doublet lens element and satisfies the condition:

$0.2 < n_2 - n_1 < 0.3$, wherein n1 and n2 are the indices of refraction of the first and second lens elements, respectively, of the contact doublet lens element.

19. The zoom lens configuration of claim 18, wherein the ratio of the center thickness $t_{2n}$ of the fourth lens element in the second group of lens elements to the overall thickness $t_{2GT}$ of the second group of lens elements satisfies the condition:

$t_{2n}/t_{2GT} > 0.2$.

20. The zoom lens configuration of claim 15, wherein the first group of lens elements includes a lens element having an aspherical surface.

21. The zoom lens configuration of claim 15 having a zoom ratio greater than 2.0.

22. The zoom lens configuration of claim 15, having a zoom ratio of approximately 2.5.

23. The zoom lens configuration of claim 15 having an angle of view greater than 90°.

24. The zoom lens configuration of claim 15, having an angle of view of approximately 94°.

25. The zoom lens configuration of claim 15, wherein the second lens element has a shape factor X that satisfies the condition:

0<X<1.5.

26. The zoom lens configuration of claim 15, wherein the at least one lens element having a negative refractive power in the group of lens elements has a shape factor X that satisfies the condition:

X<1.9.

27. The zoom lens configuration of claim 15, wherein the lens element having a positive refractive power in the first group of lens elements has a shape factor that satisfies the condition:

1>X<2.

28. A method of achieving a zoom ratio over two and well corrected optical aberrations, the method comprising:

passing light through a first group of lens elements which are movable with respect to an image plane and having an overall negative refractive power;

passing the light through a first lens element in a second group of lens elements which are moveable with respect to the image plane, wherein the first lens element has a positive refractive power and has a shape factor X that satisfies the condition:

0<X<1.5;

passing the light through a second lens element in the second group of lens elements, wherein the second lens element has a positive refractive power;

passing the light through at least one lens element in the first group of lens elements which has a negative refractive power; and passing the light through a lens element in the first group of lens elements which has a positive refractive power.

29. The method of claim 28, wherein the method further comprises passing the light through at least a second lens element in the first group of lens elements, wherein the at least a second lens element has a negative refractive power and has a shape factor X that satisfies the condition:

$X \leq -1.9$.

30. The method of claim 29, wherein the method further comprises:

passing the light through a contact doublet lens element in the second group of lens elements wherein the contact doublet lens satisfies the following condition:

$0.2 < n_2 - n_1 < 0.3$, wherein n1 and n2 are the indices of refraction of the first and second lens elements, respectively, of the contact lens element;

passing the light through a third lens element comprising a meniscus shaped lens element in the second group of lens elements, wherein the meniscus shaped lens element has a negative refractive power and has a concave surface on the image plane side;

passing the light through a fourth lens element in the second group of lens elements which has a positive refractive power and wherein the ratio of the center thickness $t_{2n}$ of the fourth lens element to the overall thickness $t_{2GT}$ of the second group of lens elements satisfies the condition:

$t_{2n}/t_{2GT} > 0.2$; and passing the light through a lens element in the second group of lens elements which has a positive refractive power.

31. The method of claim 28, further comprising passing the light through a lens element in the first group of lens elements having an aspherical surface.

32. The method of claim 28, wherein the second lens element has a shape factor that satisfies the condition:

$0 < X < 1.5$.

33. The method of claim 28, wherein the at least one lens element in the first group of lens elements which are a negative refractive power has a shape factor X that satisfies the condition:

$X < -1.9$.

34. The method of claim 28, wherein the lens element in the first group of lens elements which has a positive refractive power has a shape factor X that satisfies the condition:

$1 \leq X \leq 2$.

* * * * *